Nov. 17, 1953 W. S. BOWEN 2,659,587
CALCINING APPARATUS
Filed Jan. 11, 1951 3 Sheets-Sheet 1

INVENTOR.
WILLIAM SPENCER BOWEN
BY
Campbell, Brumbaugh, Free & Graves
HIS ATTORNEYS.

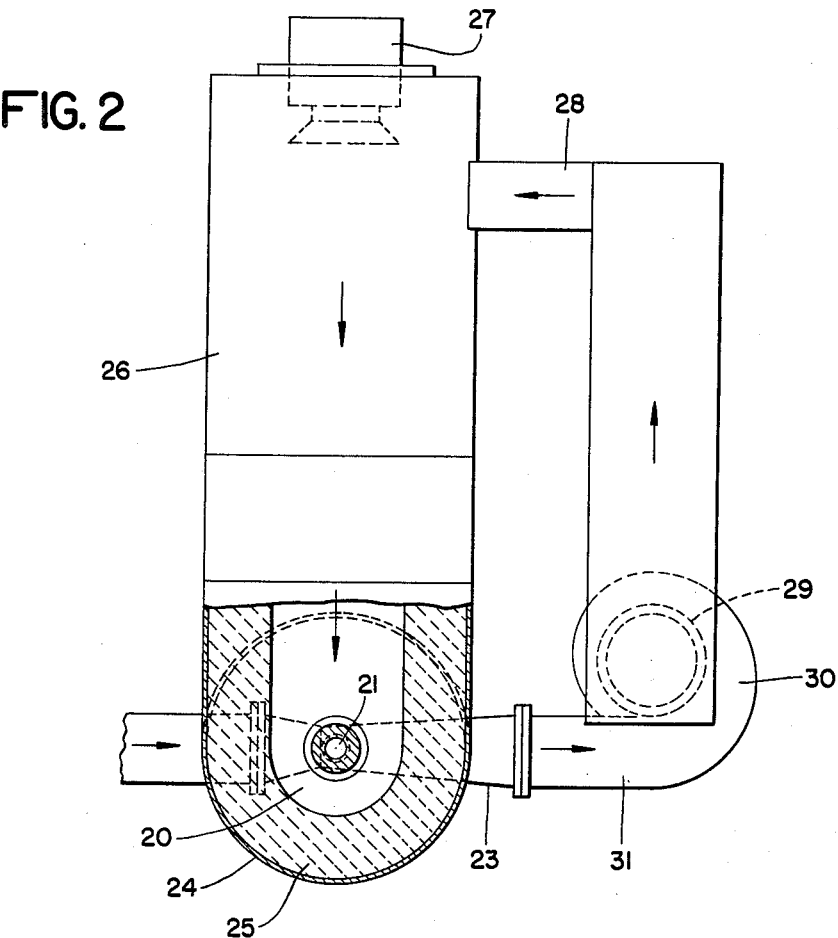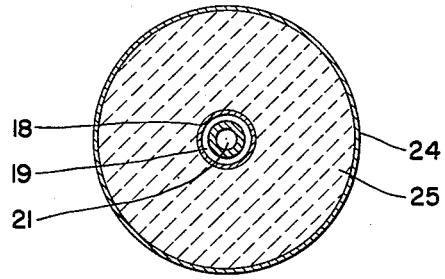

INVENTOR.
WILLIAM SPENCER BOWEN
BY
HIS ATTORNEYS.

Patented Nov. 17, 1953

2,659,587

UNITED STATES PATENT OFFICE 2,659,587

CALCINING APPARATUS

William Spencer Bowen, Westfield, N. J.

Application January 11, 1951, Serial No. 205,527

10 Claims. (Cl. 263—21)

The present invention relates to apparatus for treating materials of various kinds and embodies, more specifically, an improved apparatus by means of which calcining, roasting, drying, and similar operations may be performed.

In applicant's prior Patent No. 2,335,732, there is described apparatus by means of which material may be treated by subjecting it to a counter-current flow of a fluid such as air or products of combustion. The present invention comprises an improvement of the apparatus above referred to, and an object of this invention, more particularly, is to provide, in treating apparatus of the above character, means by which the treated material may be effectively removed from the treating chamber.

In order that the invention may be understood more fully, it will be described in connection with the structures shown in the accompanying drawings, wherein Figure 1 is a view in front elevation, with parts cut away and partly in section, showing one form of apparatus embodying the present invention;

Figure 2 is a view in horizontal section, taken on the plane indicated by the line 2—2 of Figure 1, and looking in the direction of the arrows;

Figure 3 is a view in horizontal section, taken on the line 3—3 of Figure 1, and looking in the direction of the arrows.

Figure 1:
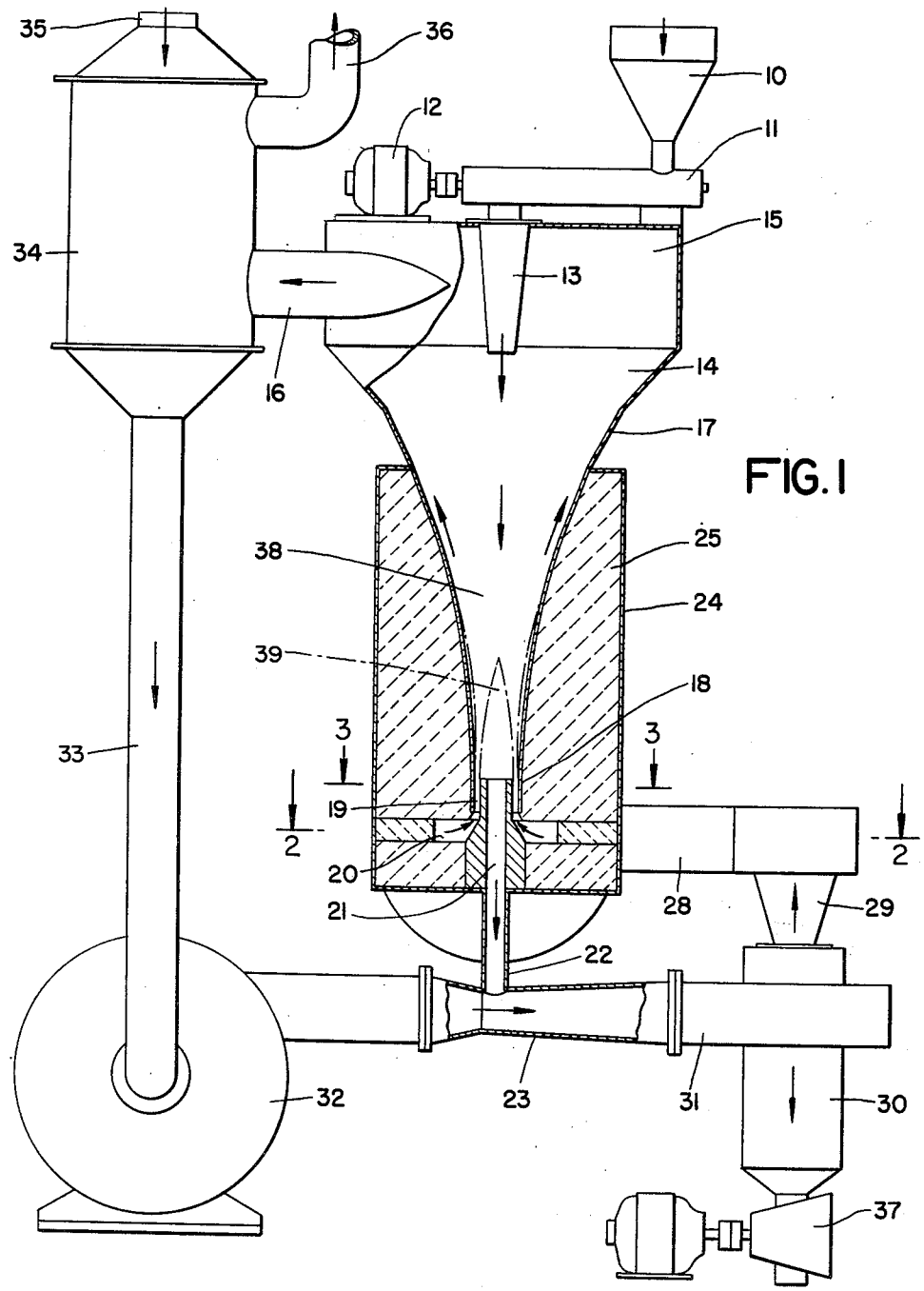

With reference to the form of the invention shown in Figures 1, 2, and 3, material to be treated, such a powdered limestone, is received in a hopper 10 from which it is delivered to a suitable feed mechanism 11, such as a screw feeder driven by a motor 12. The feed mechanism 11 delivers the material to a feed nozzle 13 from which the material is introduced into a treating chamber 14, the upper portion 15 of which is formed as a cylindrical chamber with a tangential outlet pipe 16 discharging therefrom. The lower portion 17 of the chamber 14 is formed with downwardly and inwardly converging walls having the general configuration of a morning glory, the narrowest portion of which is illustrated at the bottom by the reference character 18.

A suitable treating fluid, such as products of combustion, is introduced into the lower portion 18 of the chamber through an annular feed nozzle 19, which is supplied with a treating fluid from a manifold 20, the fluid being derived from a mechanism presently to be described.

Concentric to the nozzle 19 is a discharge duct 21 communicating with a discharge pipe 22 that is connected to the throat of a Venturi fitting 23.

A casing 24 provided with heat insulating material 25 is provided around the appropriate portions of the walls 17 and manifold 20 in order to protect these elements and also prevent heat losses therefrom.

Products of combustion are delivered to the manifold 20 from a suitable furnace 26, this furnace being fired with fuel in any well known manner such, for example, as from an oil burner 27, and supplied with air from a duct 28 that communicates with an air outlet 29 of a cyclone type collector 30. The inlet 31 of the collector receives air and the products discharged through the outlet pipe 22 from the Venturi section 23, this air being supplied from a fan 32 and a supply pipe 33 therefor. The air furnished through the supply pipe is preheated in a heat interchanger device 34, the air being received from an air inlet pipe 35. Products of combustion passing through the treating chamber 14 and out the discharge pipe 16 are brought into heat interchange relationship with air entering through the heat interchanger 34. The products of combustion are then discharged from the heat interchanger device 34 through an outlet pipe 36.

The treated material that is discharged through the outlet pipe 22 and into the cyclone collector 30 is thus cooled by giving up some of its heat to the air that is subsequently to be used to support combustion in the furnace 26. Such material is then cooled in the cyclone collector 30 and discharged through a suitable valve mechanism 37.

In operation, the upward blast of the products of combustion from the annular nozzle 19 produces a flow of sufficiently great strength in the general region 38 of the treating chamber 14 to arrest the downward flow of the material introduced through the feed nozzle 13. At this point the material floats generally upon the upwardly moving stream of gas until the particles have been treated sufficiently (for example, by calcining, roasting, or drying) at which time the particles of material reach the general region indicated in dot-and-dash lines and designated by the reference character 39. Here the region of low pressure created by the aspirating effect of the Venturi section 23 permits the treated material to descend and to be discharged in the manner previously mentioned.

The operation of the mechanism above described will thus be seen to permit of a continuous flow of the treating gases as well as of the material that is being treated, and the structure is such that the foregoing operation takes place while conserving a substantial portion of the heat utilized in the treating process. The aspirating effect of the Venturi nozzle 23 is of great importance inasmuch as it assures effective removal of the treated material from the treating chamber 14.

In the form of the invention illustrated in Figure 4, the manifold 20 is supplied with products of combustion from the furnace 26, the air supply of which is received from duct 28 and cyclone collector 30 in a manner generally described in connection with the structure shown in Figures 1, 2, and 3. This cyclone collector is a secondary one, inasmuch as the primary collection of the treated material occurs, in this form of the invention, in a manner now to be described.

The discharge pipe 22 extends downwardly and is provided with an outlet 40 which is coaxial with respect to an annular inlet nozzle 41 communicating with an inlet manifold 42. Air is directed under pressure into the manifold 42 from a fan 43, duct 44, and supply duct 45. The supply duct 45 is provided with a parallel portion 46 through which air is directed into a manifold 47 which furnishes air to an annular nozzle 48 coaxial to a discharge pipe 49 formed at the base of a housing 50. The housing 50 is formed similarly to the housing 17, the upper portion thereof receiving the air from the nozzle 41 and the treated material from the outlet 40. Air is discharged from the housing 50 through a discharge pipe 51 into the cyclone collector 30.

The discharge pipe 49 discharges the treated material into a Venturi section 52 receiving air from a supply pipe 53 and delivering it to a cyclone collector 54, the outlet of which communicates with a duct 55 that supplies air to the blower 43. The material collected by the cyclone collector 54 is discharged into a suitable receiver 56.

Figure 4:
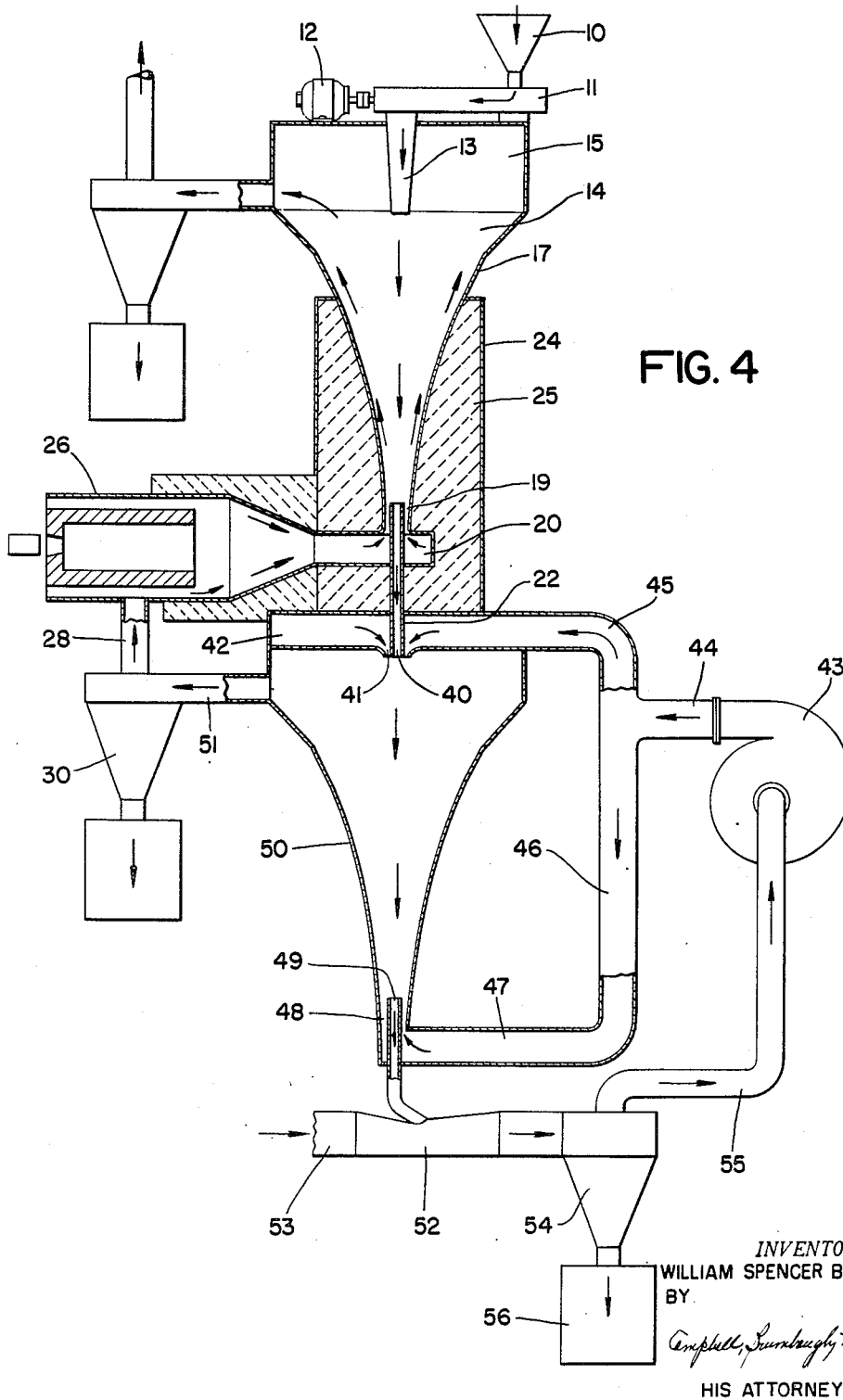
Figure 4 is a view similar to Figure 1, showing a modified form of the invention.

In the operation of the mechanism shown in Figure 4, the treated material passing downwardly through the discharge pipe 22 is aspirated into the housing 50 by means of the air issuing from the annular nozzle 41. This treated material thus descends through the housing 50 where its heat is given up to the air in the housing 50 that rises generally upwardly from the annular nozzle 48 and discharges through the discharge duct 41. In this fashion the treated material in the housing 50 descends through the upwardly moving current of air and discharges from the housing in a fashion similar to that hereinabove described in connection with the treating chamber 14. The discharge through the outlet 49 is facilitated by the aspirating effect of the Venturi section 52.

While the invention has been described with specific reference to the accompanying drawings, it is not to be limited save as defined in the appended claims.

I claim:

1. Treating apparatus, comprising a housing forming a treating chamber, means to introduce material to be treated into the upper central portion of the chamber, a fluid outlet adjacent the periphery of the upper portion of the chamber, side walls for the housing extending downwardly from the upper portion and converging into a lower extremity of relatively restricted diameter, an axial discharge pipe in the lower extremity of the housing, said discharge pipe having an upper extremity in and closely spaced from the lower extremity of the converging housing side walls to form an annular inlet nozzle, and means to create a relatively low pressure in the discharge pipe.

2. A device, according to claim 1, wherein the housing side walls curve downwardly and inwardly.

3. A device, according to claim 1, wherein the means to create the low pressure comprises an aspirator mechanism.

4. Treating apparatus, comprising a housing forming a treating chamber, means to introduce material to be treated into the upper central portion of the chamber, a fluid outlet adjacent the periphery of the upper portion of the chamber, side walls for the housing curving downwardly and inwardly to form an inlet at the lower extremity thereof, an axially extending discharge pipe closely spaced from the inlet side walls to form an annular inlet nozzle, means to supply a treating fluid to the annular inlet nozzle, and means to subject the discharge pipe to a partial vacuum.

5. Treating apparatus, comprising a housing forming a treating chamber, means to introduce material to be treated into the upper central portion of the chamber, a fluid outlet adjacent the periphery of the upper portion of the chamber, side walls for the housing curving downwardly and inwardly to form an inlet at the lower extremity thereof, an axially extending discharge pipe spaced from the inlet side walls to form an annular inlet nozzle, a furnace to produce products of combustion for use as a treating fluid, means to direct air to the furnace, a Venturi section in the air directing means and having a throat portion communicating with the discharge pipe to produce a zone of reduced pressure in the air directing means and the discharge pipe, and means communicating between the furnace and the annular inlet nozzle to supply the products of combustion to the treating chamber.

6. Treating apparatus, comprising a housing forming a treating chamber, means to introduce material to be treated into the upper central portion of the chamber, a fluid outlet adjacent the periphery of the upper portion of the chamber, side walls for the housing extending downwardly from the upper portion and merging into a lower extremity of relatively restricted diameter, an axial discharge pipe spaced from the lower extremity of the housing side walls to form an annular inlet nozzle, a second treating chamber receiving products from the discharge pipe at its upper portion, the side walls of the second chamber extending inwardly and downwardly to form a restricted portion, a second axial discharge pipe spaced from the last named restricted portion to form a second annular inlet, a Venturi section communicating with the second discharge pipe, ducts to direct air through the Venturi section and through the second annular inlet, and means to discharge fluid from the top portion of the second chamber.

7. A device, according to claim 6, wherein an inlet manifold is formed at the top of the second chamber and communicates with such chamber by means of an annular orifice surrounding the discharge end of the first discharge pipe.

8. A device, according to claim 6, wherein an inlet manifold is formed at the top of the second chamber and communicates with such chamber by means of an annular orifice surrounding the discharge end of the first discharge pipe, and ducts to supply air from the Venturi section to the inlet manifold at the top of the second chamber.

9. A device, according to claim 6, wherein an inlet manifold is formed at the top of the second chamber and communicates with such chamber by means of an annular orifice surrounding the discharge end of the first discharge pipe, ducts to supply air from the Venturi section to the inlet manifold at the top of the second chamber, and means to separate and collect treated particles received from the venturi.

10. A device, according to claim 6, wherein a furnace is provided to supply treating fluid to the annular inlet nozzle for the first chamber, and means to direct the fluid from the discharge means for the second chamber to the furnace.

WILLIAM SPENCER BOWEN.

References Cited in the file of this patent

UNITED STATES PATENTS

| Number | Name | Date |
|---|---|---|
| 729,008 | Sutton et al. | May 26, 1903 |
| 729,009 | Sutton et al. | May 26, 1903 |
| 1,722,175 | Bowen | July 23, 1929 |
| 1,831,625 | Hardinge | Nov. 10, 1931 |
| 2,054,441 | Peebles | Sept. 15, 1936 |
| 2,409,707 | Roetheli | Oct. 22, 1946 |
| 2,575,119 | Peebles | Nov. 13, 1951 |